L. LADINSKI.
DEVICE FOR REPLACING BELTS.
APPLICATION FILED FEB. 20, 1911.
1,000,271.
Patented Aug. 8, 1911.
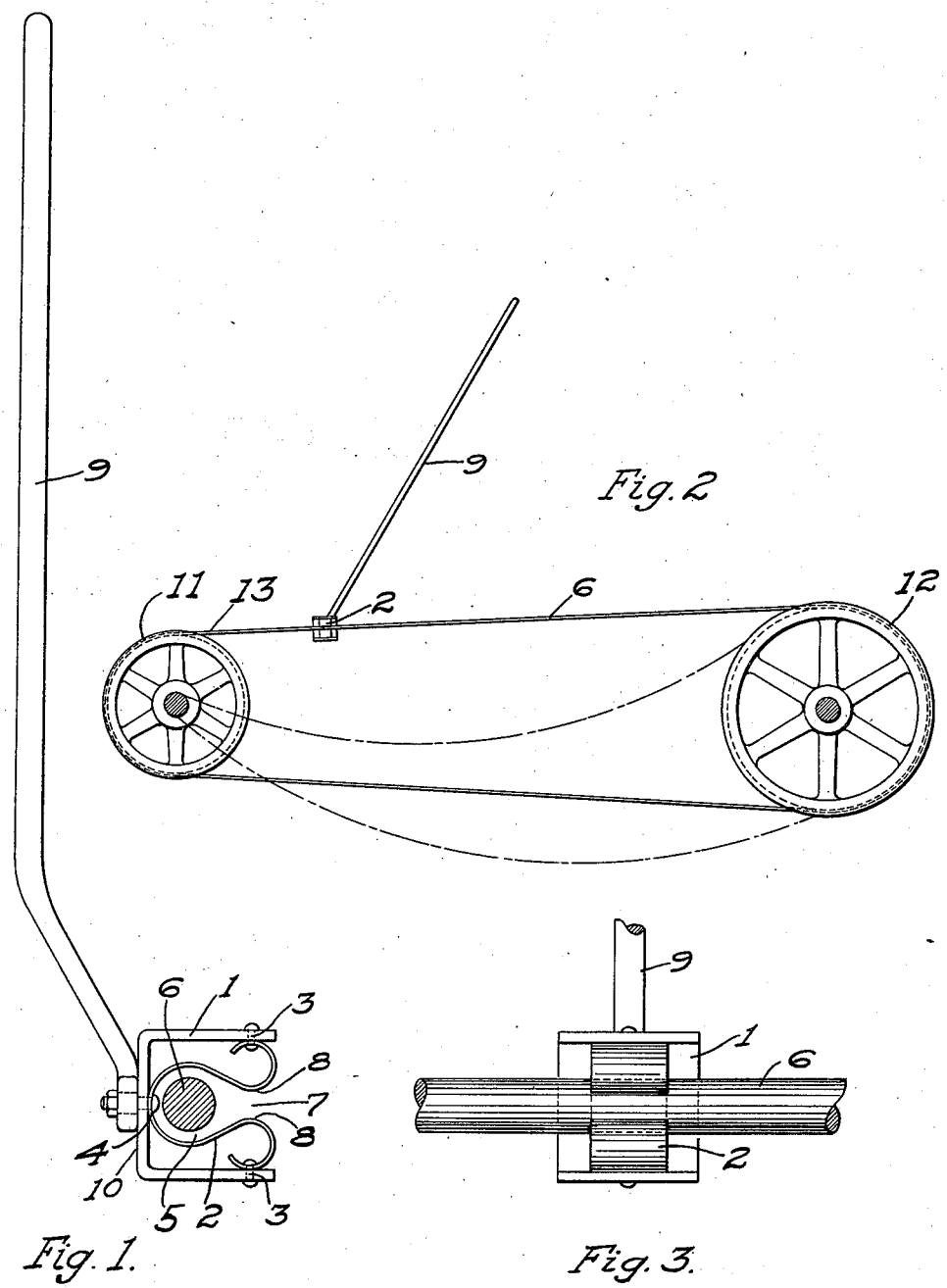

UNITED STATES PATENT OFFICE.

LOUIS LADINSKI, OF NEW YORK, N. Y.

DEVICE FOR REPLACING BELTS.

1,000,271. Specification of Letters Patent. Patented Aug. 8, 1911.

Application filed February 20, 1911. Serial No. 609,818.

*To all whom it may concern:*

Be it known that I, LOUIS LADINSKI, a citizen of the United States, residing at the city of New York, in the county of New York and State of New York, have invented certain new and useful Improvements in a Device for Replacing Belts; and I do hereby declare the following to be a full, clear, and exact description of the invention, such as will enable others skilled in the art to which it appertains to make and use the same.

This invention relates to devices for replacing belts, ropes, or other such flexible means used in transmitting power.

The object of my invention is to provide a simple and inexpensive device with which the operator may replace belts that have fallen off from their pulleys or sheaves, without bringing his hands directly near the moving parts.

It is well known that in power transmission systems for light high-speed machinery, such as are used in clothing shops, where round belts or ropes are generally used for connecting the main shaft with the countershaft for driving the machines, the belts have a tendency to fall off the pulleys frequently. As the belts have to be replaced while the shafting and pulleys are in motion it is quite dangerous to do the same by hand, due to the liability of the operator's hands getting caught in the spokes of the rotating pulleys and also to the liability of the laced belt-joint lacerating the operator's hand when replacing the belt.

My invention thus aims to prevent such accidents by providing a device which the operator may hold in his hand and therewith replace the belt that has fallen off.

My invention consists of the arrangement and features hereinafter fully described and claimed.

In the accompanying drawings Figure 1 is a general view of the device and Fig. 2 shows its application in replacing belts on pulleys. Fig. 3 is a front view of Fig. 1.

Similar reference characters refer to similar parts in the different views of the drawing.

In this device, a metallic channel-shaped member 1 is provided which serves as a frame for holding the loop-shaped member 2. The member 2 is made of flat spring-metal and is rigidly fastened to the member 1 at the points 3 and 4. The member 2 serves to hold the rope and is so formed that it affords an ample space 5 for the rope 6 to be maintained therein, while the passage 7, although made narrower than the rope, will allow the rope to pass therethrough, due to the springiness of the member 2, so that the sides 8 have to be pressed apart when the rope 6 is placed within or removed from space 5. The member 1 is pivotally mounted to the end of a rod 9, so that the aforedescribed parts can swivel about the central point of the side 10 of member 1. The rod 9 may be made of wood or metal and of any length required by conditions.

In Fig. 2, 11 is the driven pulley, 12 is the driver, and the dotted lines show rope 6 as slipped off the driven pulley 11 and disposed in the position shown in the figure. To replace the rope, the operator takes hold of the rod 9 and places the rope within the space 5 as shown in Fig. 1. He then moves the rod 9 to bring the holding member 2 at about 13 close to the rim of the sheave or pulley 11 where the rotation of the pulley 12 will naturally cause a movement of the rope which will catch the periphery of pulley 11 and cause the rope to replace itself in position to continue the driving. When the rope is thus caught up by the pulley it releases itself readily from the member 2, due to the springiness of the sides 8 of the passage 7. Should the rope fall off the driver 12 it may be replaced in the same way as described above; that is, by placing the rope over the pulley 12 with the device. If the rope should fall off both pulleys it may be replaced by placing one end on the driven pulley 11, which can be harmlessly performed by hand as this pulley is now stationary, and then the device may be used to replace the rope on the driver pulley 12 as described above; it being now evident that the moment when the rope takes up its motion from the shafting is the dangerous part of the operation of replacing belts on pulleys. The swiveling of the joint 10 enables the operator to hold the rod 9 in any position, while the member 2 adjusts itself freely to hold the rope.

From the foregoing description the advantages of my device will be apparent and it will be seen how the object heretofore mentioned is accomplished since the device can be manipulated to replace belts readily without any possible injury to the operator, thereby preventing accidents that are now common in doing this work.

It must be understood that my invention is not to be limited to the specific construction and arrangement shown and described here, but that variations may be made in practice without however departing from the spirit of invention or the principles involved.

Having thus described my invention, I claim:—

In a device of the class described, the combination of a handle, a member fastened pivotally to the end of the handle, said member being of a U-shaped construction and secured to the handle at the bight thereof, a second U-shaped resilient member having its outer ends bent upon themselves, the ends of said second member being secured to the ends of the first mentioned member, and the bight of said second member being secured by the common means with which said first mentioned member is secured to the handle.

In testimony whereof I hereby affix my signature in presence of two witnesses.

LOUIS LADINSKI.

Witnesses:
B. ROMAN,
HUGO MOCK.

Copies of this patent may be obtained for five cents each, by addressing the "Commissioner of Patents, Washington, D. C."